(12) United States Patent
Dorrer

(10) Patent No.: US 7,411,683 B2
(45) Date of Patent: Aug. 12, 2008

(54) ELECTRIC FIELD MEASUREMENT OF OPTICAL WAVEFORMS

(75) Inventor: Christophe Dorrer, Rochester, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 278 days.

(21) Appl. No.: 11/322,613

(22) Filed: Dec. 30, 2005

(65) Prior Publication Data

US 2007/0153291 A1    Jul. 5, 2007

(51) Int. Cl.
*G01B 9/02* (2006.01)

(52) U.S. Cl. ...................................... 356/484

(58) Field of Classification Search .............. 356/450, 356/477, 484
See application file for complete search history.

(56) References Cited

U.S. PATENT DOCUMENTS

| | | | | |
|---|---|---|---|---|
| 4,856,899 | A  * | 8/1989 | Iwaoka et al. | 356/484 |
| 5,684,586 | A  * | 11/1997 | Fortenberry et al. | 356/450 |
| 6,611,336 | B1 * | 8/2003 | Walmsley et al. | 356/450 |
| 6,633,386 | B2 * | 10/2003 | Walmsley et al. | 356/450 |
| 7,145,713 | B2 * | 12/2006 | Chang et al. | 359/325 |
| 2004/0165885 | A1* | 8/2004 | Dorrer | 398/16 |
| 2006/0140638 | A1* | 6/2006 | Dorrer | 398/158 |

* cited by examiner

*Primary Examiner*—Samuel A. Turner

(57) ABSTRACT

Time magnification and heterodyning are combined to allow the single-shot characterization of the electric field of optical waveforms. The electric field of the source under test is obtained by Fourier processing of the magnified temporal intensity of the source heterodyned with a monochromatic source. An experimental implementation of this technique is characterized and used to measure various optical signals.

20 Claims, 7 Drawing Sheets

ELECTRIC FIELD MEASUREMENT OF OPTICAL WAVEFORMS

FIELD OF THE INVENTION

The present invention relates generally to the field of photonics and in particular to a method for the single-shot measurement of the electric field of optical waveforms using time magnification and heterodyning.

BACKGROUND OF THE INVENTION

The ability to measure time-varying fields has led to significant advances in a number of technological fields including optical chirped pulse amplification, pump-probe spectroscopy, coherent control, optical telecommunications and radar. Additionally, the temporal resolution of measurement systems is practically limited by many factors such as the bandwidth of any photodetectors used and electronics employed, consequently indirect approaches have been developed to characterize high speed electrical and optical signals.

Performing measurements in a single shot, e.g., to temporally resolve non-repetitive events, is more challenging than measuring merely repetitive signals. The equivalence between spatial diffraction and chromatic dispersion on the one hand, and the effect of a spatial lens and a quadratic temporal phase modulation on the other hand, can be used to provide temporal magnification of optical waveforms (See, e.g., W. J. Caputi, "Stretch: a time transformation technique", *IEEE Trans. Aerosp. Electron. Syst.* AES-7, 269-278 (1971); B. H. Kolner, "Space-time duality and the theory of temporal imaging", *IEEE J Quantum Electron*. 30, 1951-1963 (1994)).

As is known in the art, the intensity of a signal under test can be measured in a single shot using low-speed photodetection and conventional electronics after the measured signal interacts with a chirped optical pulse for which there is a mapping between time and frequencies (See, e.g., C. V. Bennet, E. P. Scott, and B. H. Kolner, "Temporal magnification and reversal of 100 Gb/s optical data with an up-conversion time microscope", *Appl. Phys. Lett.* 65 , 2515 (1994); F. G. Sun, Z. Jiang, and X.-C. Zhang, "Analysis of terahertz pulse measurement with a chirped probe beam", *Appl. Phys. Lett.* 73, 2233-2235 (1998); L. Kh. Mouradian, F. Louradour, V. Messager, A. Barthélémy, and C. Froehly, "Spectro-temporal imaging of femtosecond events", *IEEE J. Quantum Electron.* 36, 795-801 (2000); and A. S. Bhushan, P. V. Kelkar, B. Jalai, O. Boyraz, and M. Islam, "130-GSa/s photonic analog-to-digital converter with time stretch processor", *IEEE Photon. Technol. Lett.* 14, 684-686 (2002). Unfortunately however, none of these techniques provide phase information.

SUMMARY OF THE INVENTION

I have developed a method that performs the single-shot measurement of the electric field of optical waveforms by combining the principles of time microscopy and heterodyning. Unlike prior art measurement methods, my inventive method advantageously provides phase information as well.

DETAILED DESCRIPTION

Figure 1:
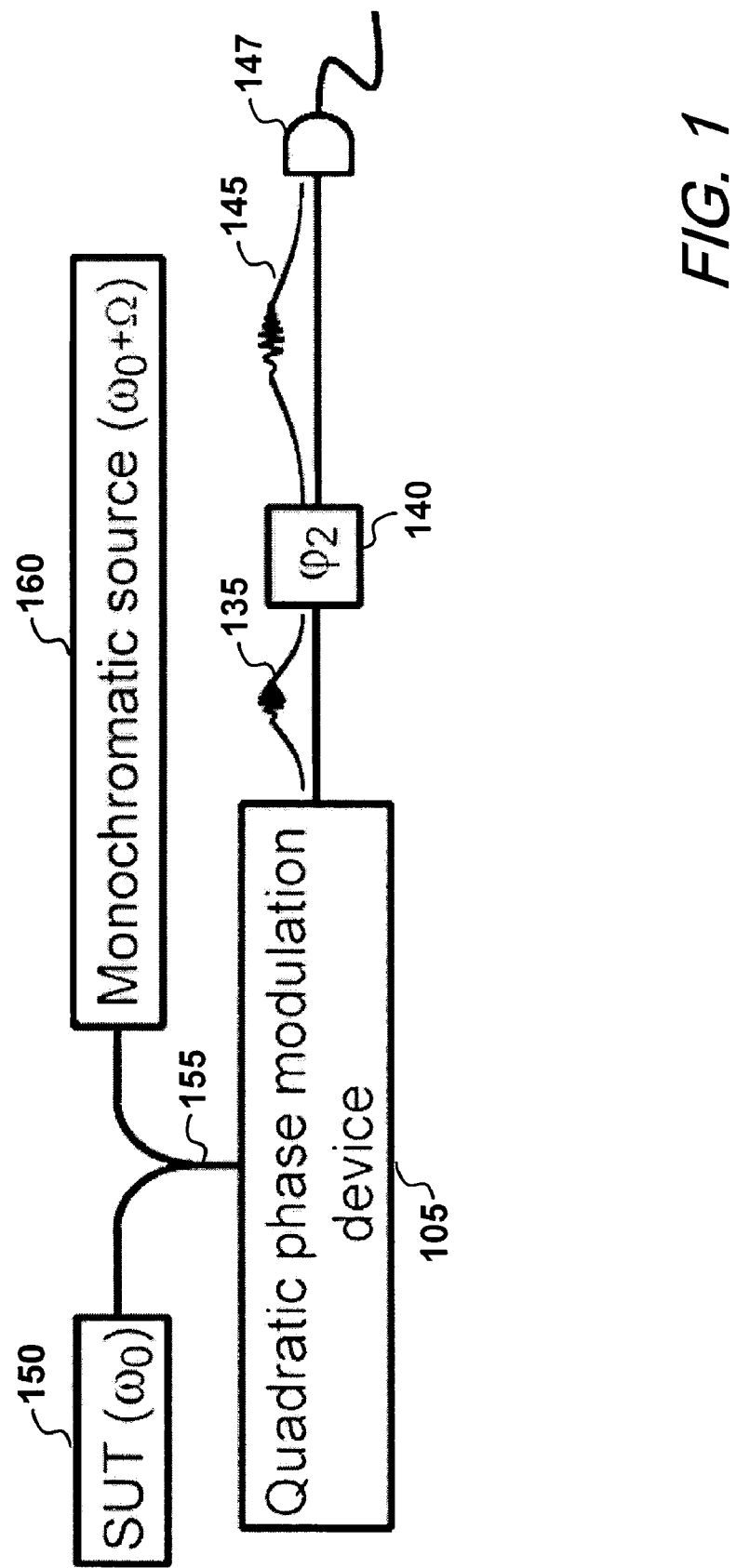
FIG. 1 is a schematic of a setup for the single-shot measurement of the electric field of optical waveforms according to the present invention.

The principles of my inventive technique may be understood with initial reference to FIG. 1. In particular, a quadratic phase modulation device 105 provides chirped modulation on an incoming optical signal 155. Illustratively, such chirped modulation can be written as a temporal phase modulation $$-\frac{t^2}{2\varphi_1}.$$

Such modulation has the effect of adding a quadratic temporal phase modulation on the incoming signal 155. Therefore, the modulated signal 135 is—up to some phase or amplitude factors or central frequency difference—a replica of the incoming signal 155 with an added quadratic temporal phase. Essentially, the modulated signal 135 has the same intensity as the incoming signal 155, but has the time-varying phase induced by the quadratic phase modulation device 105.

A quadratic temporal phase modulation can be understood as a modulation with a frequency varying linearly as a function of time, i.e. the instantaneous frequency associated at instant t is $$\frac{t}{\varphi_1},$$

and the effect of the device 105 on the signal 155 therefore encodes the temporal variations of the intensity of the signal 155 on the spectrum of the modulated signal 135.

Additional stretching of this modulated signal 135 is performed through the effect of a dispersive element 140 having a second order dispersion $\phi_2$ producing a stretched pulse 145. The intensity of the stretched pulse 145 can be measured, illustratively with the photodiode 147 and associated/subsequent electronics.

The intensity of the stretched pulse 145 is known to be a representation of the intensity of the incoming optical signal with temporal magnification 1

$$1 + \frac{\varphi_2}{\varphi_1}$$

in a time window given by the duration of the chirped modulation induced by the device 105.

Advantageously, the electric field of a source under test 150 (SUT) can be measured when the modulating optical signal 155 is a combination of the SUT 150 with a co-polarized monochromatic optical source 160 having an optical frequency outside the spectral support of the SUT 150.

The intensity of modulating optical signal 155 so produced by the combined sources may be represented as $$|E(t) \cdot \exp(i\omega_0 t) + E_0 \cdot \exp[i(\omega_0 + \Omega)t]|^2$$

where $E(t) \cdot \exp(i\omega_0 t)$ is the electric field of the SUT 150 and $E_0 \cdot \exp[i(\omega_0 + \Omega)t]$ is the electric field of the monochromatic optical source 160 at the optical frequency $\omega_0 + \Omega$.

This intensity can be decomposed as $I_0 + I(t) + 2 \cdot \text{Re}[E(t) \cdot E_0^* \cdot \exp(-i\Omega t)]$, from which the complex quantity $E(t) \cdot E_0^* \cdot \exp(-i\Omega t)$ can be extracted via numerical Fourier processing provided that its Fourier transform (located around the frequency $\Omega$) does not overlap with the Fourier transform of $I_0 + I(t)$. This can be ensured by a proper choice of the optical frequency of the monochromatic laser 160. The electric field of the source under test 150 $E(t)$ is therefore measured in the time window of the apparatus.

The measurement bandwidth is limited only by the bandwidth of the modulating element 105 and the bandwidth of the time-magnification setup, but is further constrained by the necessity of sampling quickly varying temporal fringes in the heterodyne approach.

In one embodiment of the principle of my inventive technique, the quadratic phase modulation device 105 for providing quadratic temporal phase modulation is a phase modulator (for example a Lithium Niobate phase modulator) driven by an essentially quadratic temporal voltage, and various associated electronics. It will be apparent to those skilled in the art that such combination leads to the quadratic temporal phase modulation of the incoming signal 155, and therefore to the generation of the modulated signal 135.

In another embodiment of the principle of my inventive technique the quadratic phase modulation device 105 for providing quadratic temporal phase modulation is a combination of an appropriate nonlinear medium and optical source. A nonlinear medium with an appropriate third order optical nonlinearity can be used to induce cross phase modulation. A pump pulse with temporal intensity varying essentially quadratically with time in a given time window is used to induce cross-phase modulation of the incoming signal 155. As is known to those skilled in the art, cross-phase modulation adds a temporal phase on the signal 155, this temporal phase being proportional to the temporal intensity of the pump pulse. The combination of the nonlinear medium and pump pulse therefore represents an embodiment of the device 105 for the generation of the chirped signal 135.

Figure 2:
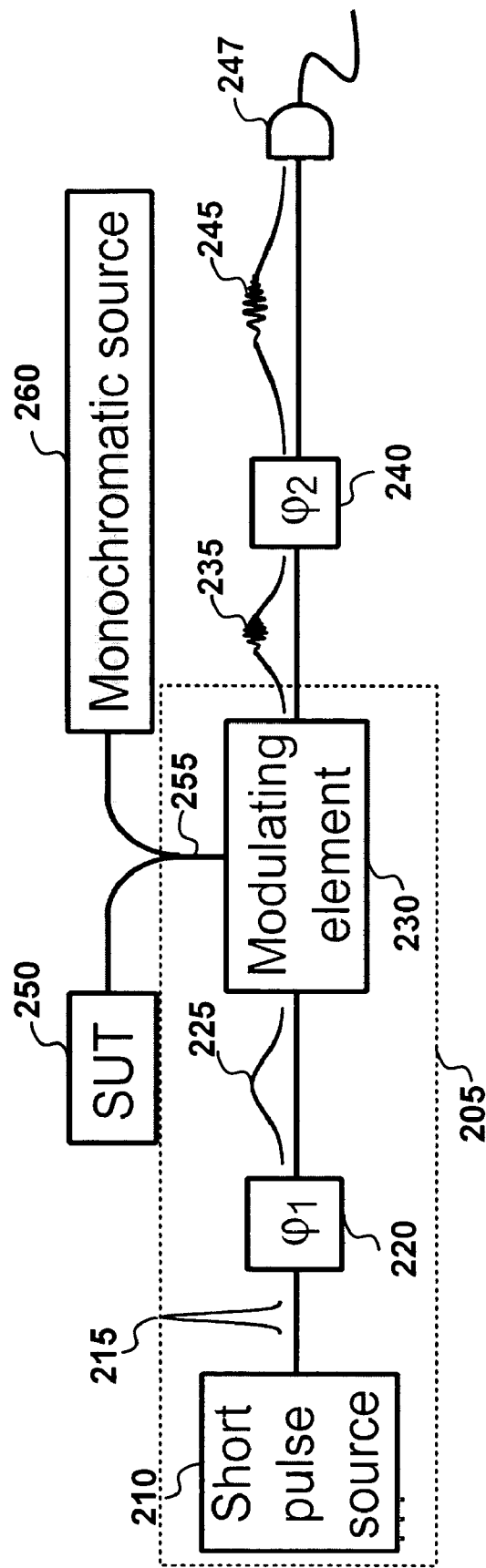
FIG. 2 is a schematic of an alternative embodiment of a setup for the single-shot measurement of the electric field of optical waveforms according to the present invention.

Another embodiment depicting the principle underlying my inventive technique may be understood with initial reference to FIG. 2. In this embodiment, the quadratic phase modulation device 205 for providing quadratic temporal phase modulation on the incoming signal 255 is mainly composed of an optical source 210, a dispersive element 220 and a modulating element 230. In particular, a short pulse source 210 generates a high-bandwidth optical pulse 215 which is stretched by a first dispersive element 220 exhibiting a second order dispersion $\phi_1$ thereby leading to a time-to-frequency mapping of the stretched pulse 225.

This stretched pulse 225 is then sent to a modulating element 230, whose transmission may be controlled by the intensity of an incoming optical signal 255, for example a Mach-Zehnder modulator biased at quadrature and driven by an electrical voltage from a photodetector. Other suitable modulating elements 230 include, but are not restricted to, nonlinear interactions based on three-wave mixing and four-wave mixing, which are known to those skilled in the art as suitable to implement an intensity-dependent gate of an optical signal onto another optical signal. Appropriate interaction of the chirped pulse 225 with the incoming signal 255 leads to a signal with temporal intensity essentially given by that of the incoming signal 255 and instantaneous frequency varying essentially linearly with time.

The modulating element 230 encodes the temporal intensity of the incoming optical signal 255 onto the optical spectrum of the high bandwidth pulse producing the modulated signal 235. Additional stretching of this modulated signal 235 is performed through the effect of a second dispersive element 240 having a second order dispersion $\phi_2$ producing a further stretched pulse 245. The intensity of the further stretched pulse 245 can be measured, illustratively with the photodiode 247 and subsequent electronics.

The intensity of this further stretched pulse 245 is known to be a representation of the intensity of the incoming optical signal with temporal magnification $$1 + \frac{\varphi_2}{\varphi_1}$$

in a time window given by the duration of the stretched pulse 225, i.e. approximately given by the product of $\phi_1$ and the bandwidth of the short optical pulse 215.

Advantageously, the electric field of a source under test 250 (SUT) can be measured when the modulating optical signal 255 is a combination of the SUT 250 with a co-polarized monochromatic optical source 260 having an optical frequency outside the spectral support of the SUT 250.

The intensity of modulating optical signal 255 so produced by the combined sources may be represented as $$|E(t) \cdot \exp(i\omega_0 t) + E_0 \cdot \exp[i(\omega_0 + \Omega)t]|^2$$

where $E(t) \cdot \exp(i\omega_0 t)$ is the electric field of the SUT 250 and $E_0 \cdot \exp[i(\omega_0 + \Omega)t]$ is the electric field of the monochromatic optical source 260 at the optical frequency $\omega_0 + \Omega$.

This intensity can be decomposed as $I_0 + I(t) + 2 \cdot \text{Re}[E(t) \cdot E_0^* \cdot \exp(-i\Omega t)]$, from which the complex quantity $E(t) \cdot E_0^* \cdot \exp(-i\Omega t)$ can be extracted via numerical Fourier processing provided that its Fourier transform (located around the frequency $\Omega$) does not overlap with the Fourier transform of $I_0 + I(t)$. This can be ensured by a proper choice of the optical frequency of the monochromatic laser 260. The electric field of the source under test 250 $E(t)$ is therefore measured in the time window of the apparatus.

The measurement bandwidth is limited only by the bandwidth of the modulating element 230 and the bandwidth of the time-magnification setup, but is further constrained by the necessity of sampling quickly varying temporal fringes in the heterodyne approach.

Experimental Results

In an exemplary configuration for the single-shot measurement of optical waveforms according to the present invention, the modulation of a chirped optical pulse is performed by photodetection of the intensity of the combination of the SUT and monochromatic laser followed by electro-optic modulation. Advantageously, this approach could be extended to bandwidth of the order of 100 GHz using specialized components, while much higher bandwidth would be obtained with embodiments based on nonlinear optics, e.g. by nonlinear mixing of the incoming optical signal with a chirped optical pulse in an appropriate nonlinear medium as mentioned previously.

Accordingly, the source under test is sent to a photodetector with 10 ps impulse response followed by a RF amplifier with analog bandwidth of 38 GHz. The output of the amplifier is used to drive a Mach-Zehnder modulator (MZM). Broadband pulses at 1540 nm are obtained by propagation of pulses from a 10 MHz passively mode-locked fiber laser in 400 meters of highly nonlinear fiber. Chromatic dispersion is induced with 906 meters of single-mode fiber ($\phi_1$=—18.3 ps$^2$). A polarization controller is used to align the stretched pulse into the MZM. The output of the MZM is amplified with an EDFA and then propagates into 65 km of singlemode fiber ($\phi_2$=—1313 ps$^2$). The output of the fiber is measured with a 15 GHz photodetector followed by two DC-coupled RF amplifiers having a bandwidth of 3 GHz. The amplified output is measured by an ocilloscope having an analog bandwidth of 1.5 GHz and a sampling rate of 4 Gs/s. The oscilloscope is triggered by a signal from a low-speed photodiode on which part of the initial pulse from the mode-locked laser is incident. The measured waveforms were scaled by the waveform measured in the absence of modulation in order to remove the effect of the variation of the spectral density of the broadband pulse.

Figure 3A:
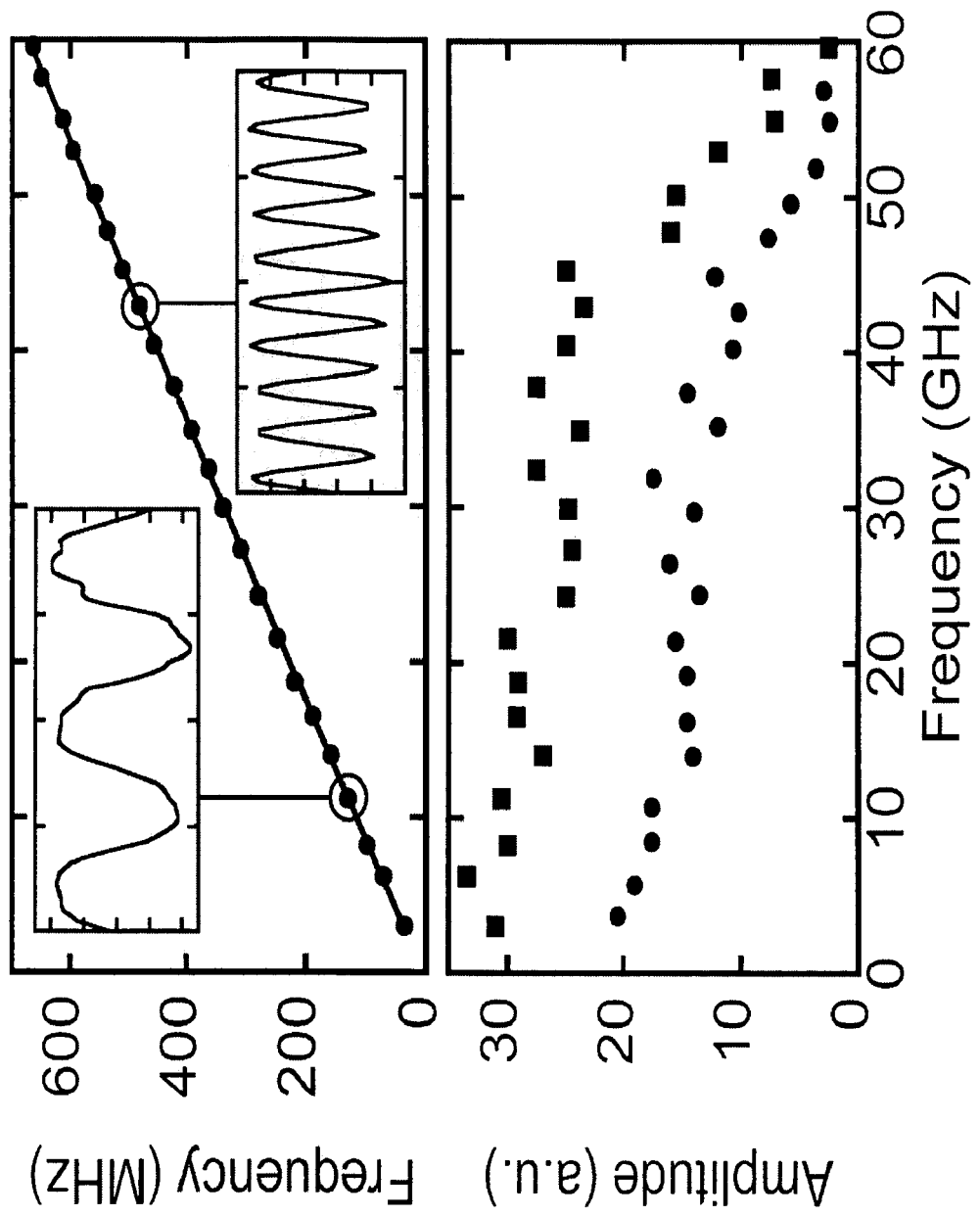
FIG. 3(a) is a graph showing the Frequency of the temporally magnified beating between two monochromatic lasers as a function of their frequency difference.

A temporal magnification equal to 88.8 was determined by measuring the temporally magnified beating between two monochromatic lasers and comparing its frequency to that calculated from the optical frequency of the lasers. A plot of that comparison is depicted in FIG. 3a. A discrepancy with the value calculated from the dispersion of the two singlemode fibers is attributed to the self-phase modulation and chromatic dispersion of the highly nonlinear fiber used to increase the bandwidth of the pulses from the mode-locked fiber laser.

Figure 3B:
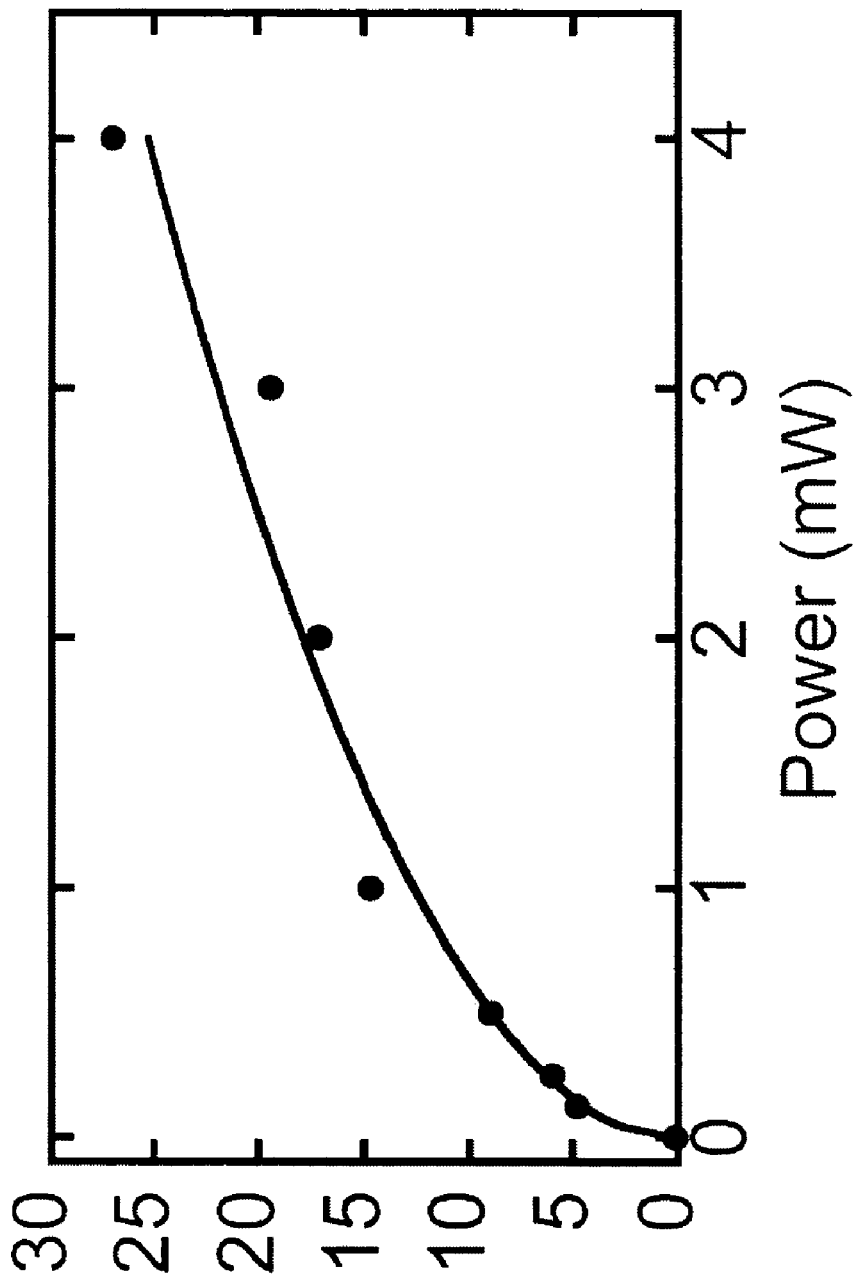
FIG. 3(b) is a graph showing the Magnitude of the temporally magnified beating between two monochromatic lasers as a function of their frequency difference.

In addition, the magnitude of the frequency response was obtained using the same procedure and it was found that the amplitude of the beating at 45 GHz is about 3 dB lower than that at DC. A plot of that comparison is depicted in FIG. 3b. The time window of the measurement system was determined to be about 500 ps, which agrees with the product of the bandwidth of the broadband pulses and chromatic dispersion of the first dispersive element.

Figure 4:
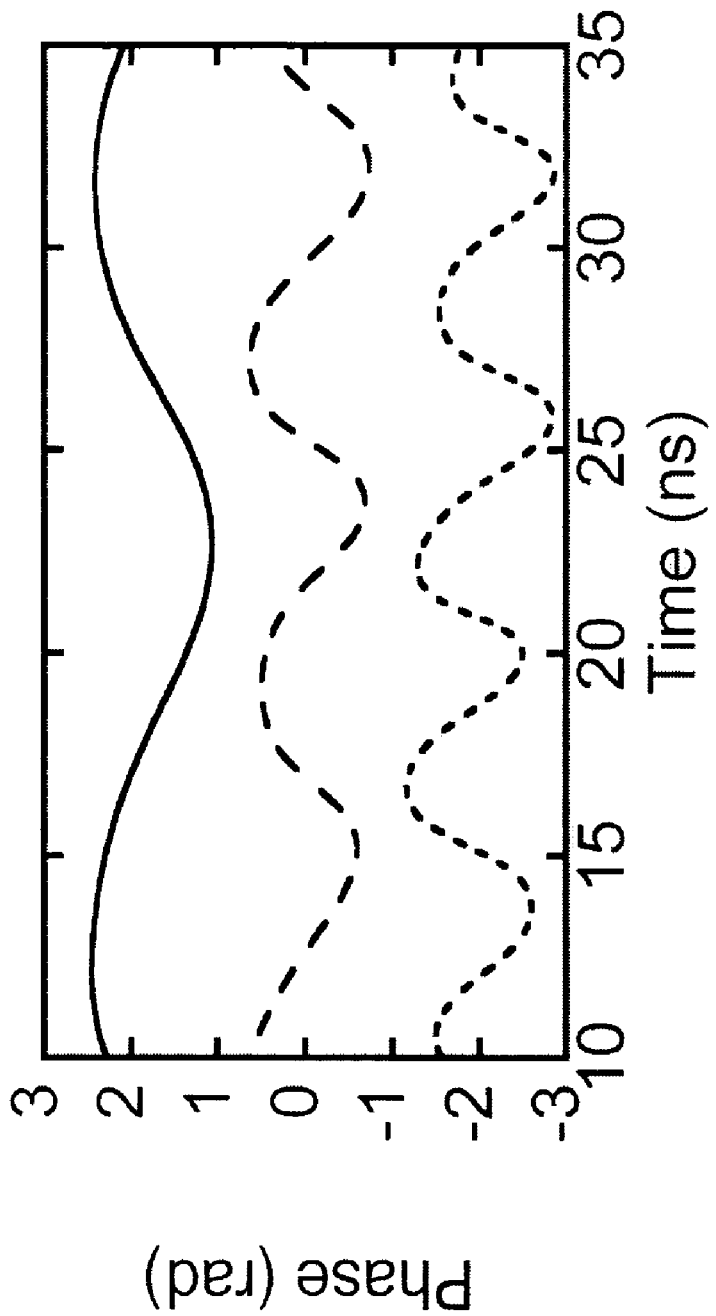
FIG. 4 is a graph of the temporally magnified phase of a monochromatic laser after modulation by a phase modulator driven by sinewaves with a frequency equal to 5 GHz (continuous line), 10 GHz (long dashed line) and 15 GHz (short dashed line)

Finally, a test of the linearity of the measurement setup was performed by measuring the magnitude of the beating between the two lasers as a function of the optical power of one of the lasers. A good agreement with the expected scaling of this beating as the square root of the modified optical power was obtained. A plot of the amplitude of the beating between the two lasers a function of the optical power of one of the lasers is shown in FIG. 4.

In another test, a phase-modulated optical signal was generated using a monochromatic laser and a Lithium-Niobate phase modulator driven by an amplified RF synthesizer. The modulated source was coupled with a second monochromatic laser operating at an optical frequency offset by about 32 GHz from that of the first monochromatic laser. The combined sources were incident on a photodetector, and Fourier filtering was performed on the measured magnified intensity to obtain the modulated electric field, according to my inventive teachings. The phases extracted for modulation frequencies equal to 5 GHz, 10 GHz and 15 GHz are plotted in FIG. 4 As can be readily observed from this FIG. 4 and as expected, the phases are essentially sinusoidal, and their periods, respectively equal to 18.3 ns, 8.8 ns and 5.8 ns, are in good agreement with the expected values of 17.8 ns, 8.9 ns and 5.9 ns calculated from the modulation frequency and the magnification of the measurement system.

Figure 5:
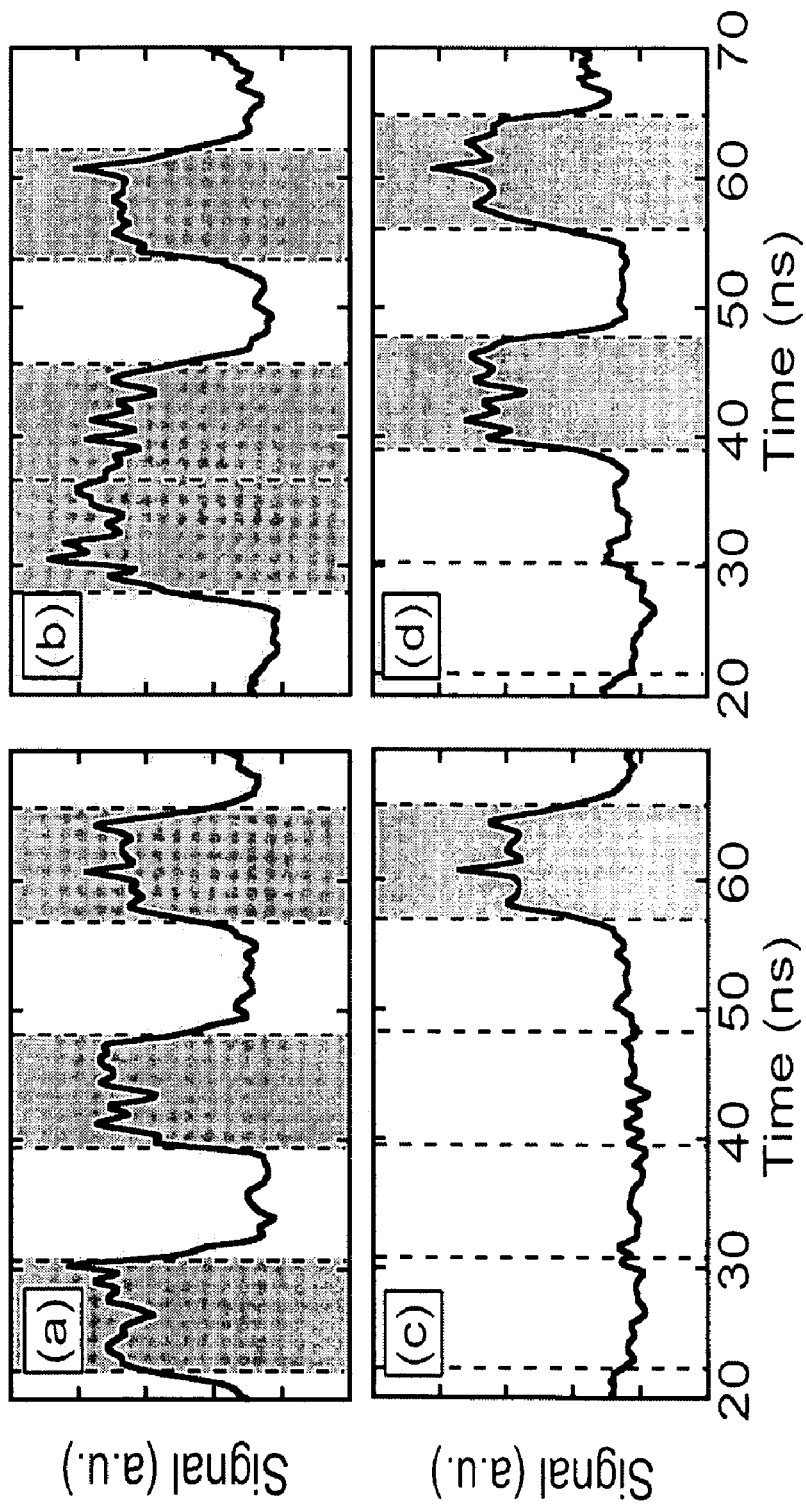
FIG. 5 is a series of graphs showing the temporally magnified intensity of 10 Gb/s NRZ-OOK optical signals exhibiting measured patterns of (a) 10101, (b) 11010, (c) 00001, and (d) 00101.

Finally, measurements were also performed on 10 Gb/s data-encoded optical signals generated using a MZM driven by a pulse pattern generator (PPG) programmed to either provide a periodic signal with alternating 0 and 1 or a pseudorandom bit sequence. As there is no trigger between the broadband pulse source and the PPG, the optical waveforms from the MZM are sampled in time windows set by the repetition rate of the pulse source without correlation with the bits or patterns from the PPG. FIG. 5 shows waveforms measured when the MZM is driven to generate non-return-to-zero on-off keyed (NRZ-OOK) signals. More specifically, FIG. 5 shows the temporally magnified intensity of the 10 Gb/s, NRZ-OOK optical signals exhibiting measured patterns of (a) 10101, (b) 11010, (c) 00001, and (d) 00101.

Figure 6:
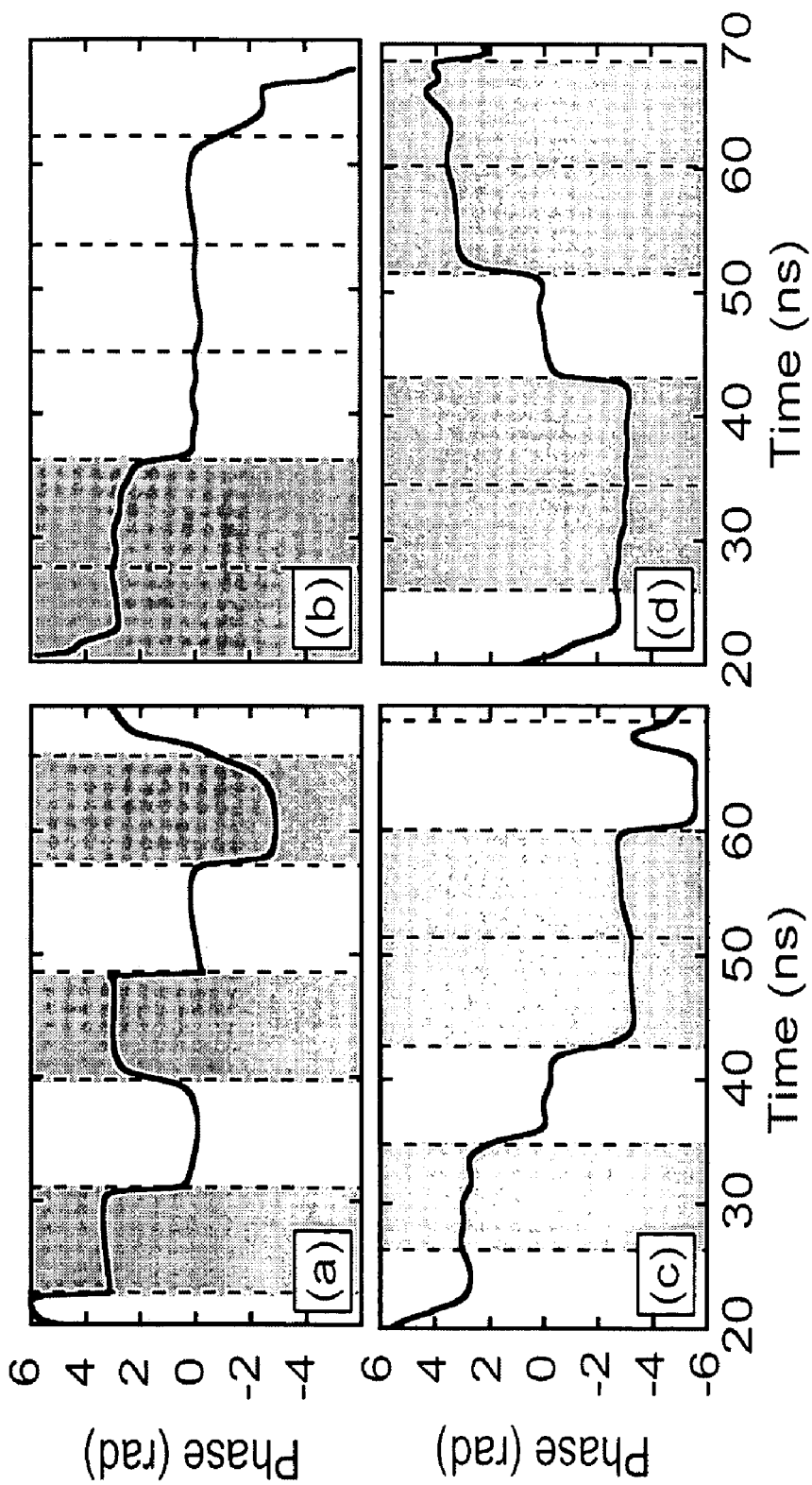
FIG. 6 is a series of graphs showing the temporally magnified phase of 10 Gb/s NRZ PSK signals exhibiting measurement patterns of (a) $\pi 0\pi 0\pi$, (b) $\pi\pi 000$, (c) $\pi 0\pi\pi 0$, and (d) $\pi\pi 0\pi\pi$.

Furthermore, the MZM can also provide non-return-to-zero phase-shift-keyed (NRZ-PSK) signals if biased at extinction and driven with an AC-coupled voltage (this implementation of binary phase shift keying is can provide noise-free π phase shifts thanks to the change of sign of the transmission of the Mach-Zehnder around extinction). FIG. 6 shows examples of the phase of measured waveforms of NRZ-PSK signals, where the π phase shifts between adjacent bits is apparent and the resulting patterns which are: (a) π0π0π, (b) ππ000, (c) π0ππ0, and (d) ππ0ππ.

As can now be readily appreciated, I have shown and described a method and exemplary apparatus for the single-shot measurement of optical waveforms. A diagnostic combining the principle of the time-stretch technique and heterodyning was used to measure the temporal variations of the electric field of an optical signal in a single shot. The experimental demonstration in the telecommunication environment has proven the measurement capability of such system. Applications to other non-repetitive high-speed optical waveforms can be made. Consequently, my invention should not be limited by the specific examples shown, but rather by the scope of the claims attached hereto.

What is claimed is:

1. A method for determining the electric field of a source under test, said method comprising the steps of:

combining the source under test with a co-polarized monochromatic optical signal having an optical frequency outside the spectral support of the source under test signal to obtain a combined signal;

generating a modulated signal having the intensity of the combined sources and a time-varying instantaneous frequency;

stretching, the modulated signal into a stretched signal through the effect of chromatic dispersion;

measuring the intensity of the stretched signal; and determining, the electric field characteristics of the source under test signal.

2. The method of claim 1, wherein the generating step includes propagating the combined signal in a phase modulator.

3. The method of claim 1, wherein the generating step includes propagating the combined signal in a nonlinear medium and inducing cross-phase modulation with an optical pulse.

4. The method of claim 1, wherein the generating step includes modulating a chirped optical pulse with the combined signal.

5. The method of claim 4, wherein the chirped optical pulse is obtained by propagation of an optical pulse in a dispersive medium.

6. The method of claim 4, wherein the modulating step includes propagating the combined signal in a nonlinear medium with a chirped optical pulse.

7. The method of claim 4, wherein the modulating step includes
   detecting the intensity of the combined signal; and
   sending a chirped optical pulse in a modulating element; and
   using the detected intensity to drive the modulating element.

8. The method of claim 1, wherein the determining step includes the step of Fourier transforming the measured intensity.

9. The method of claim 8, wherein the Fourier transform of the measured intensity is filtered.

10. An electric field measurement apparatus comprising:
    a source under test for which the electric field is determined;
    a monochromatic source;
    a modulation device, for modulating the combination of the output of the source under test and the monochromatic source, producing a modulated signal;
    a dispersive element, for producing a stretched pulse from the modulated signal; and
    a detector, for measuring the intensity of the stretched pulse.

11. The apparatus of claim 10 where said modulator device is a quadratic phase modulation device that encodes temporal variations of the intensity of the combined signal on the spectrum of the modulated signal.

12. The apparatus of claim 11 wherein said dispersive element is a second order dispersive element.

13. The apparatus of claim 10 wherein said modulation device is a phase modulator.

14. The apparatus of claim 10 wherein said modulation device is the combination of a nonlinear medium and an optical pulse.

15. The apparatus of claim 10 wherein the intensity of the combined optical signal is represented as:

$$|E(t)\cdot\exp(i\omega_0 t)+E_0\cdot\exp[i(\omega_0+\Omega)t]|^2$$

where $E(t)\cdot\exp(i\omega_0 t)$ is the electric field of the source under test and $E_0\cdot\exp[i(\omega_0+\Omega)t]$ is the electric field of the monochromatic optical source at the optical frequency $\omega_0+\Omega$.

16. The apparatus of claim 10 wherein said modulation device comprises:
    a optical source for producing a short optical pulse;
    a dispersive element, for stretching the short optical pulse into a stretched pulse;
    a modulating element for modulating the stretched pulse with the combined signal of the source under test and the monochromatic source.

17. The apparatus of claim 16 wherein said modulating element comprises a Mach-Zehnder modulator biased at quadrature.

18. The apparatus of claim 16 wherein said modulating element encodes the temporal intensity of the combined optical signal onto the optical spectrum of the stretched pulse thereby producing a modulated signal.

19. The apparatus of claim 18 further comprising a second dispersive element, for producing a further stretched pulse from the modulated signal.

20. The apparatus of claim 19 further comprising a photodiode, for measuring the intensity of the further stretched pulse.

* * * * *